United States Patent [19]

Kawamura et al.

[11] Patent Number: 4,676,207
[45] Date of Patent: Jun. 30, 1987

[54] AUXILIARY COMBUSTION CHAMBER

[75] Inventors: Mitsuyoshi Kawamura; Masato Taniguchi, both of Aichi, Japan

[73] Assignee: NGK Spark Plug Co., Ltd., Aichi, Japan

[21] Appl. No.: 720,187

[22] Filed: Apr. 5, 1985

[30] Foreign Application Priority Data

Apr. 6, 1984 [JP] Japan .................................. 59-68894

[51] Int. Cl.⁴ ............................................. F02B 19/00
[52] U.S. Cl. .................................. 123/271; 123/270; 123/273
[58] Field of Search ............... 123/271, 270, 273, 254, 123/286; 428/36; 29/156.4 WL

[56] References Cited

U.S. PATENT DOCUMENTS

| | | | |
|---|---|---|---|
| 2,006,613 | 7/1935 | Worrer | 123/273 |
| 2,739,578 | 3/1956 | Stump | 123/286 |
| 2,865,346 | 12/1958 | Liebal | 123/271 |
| 2,932,289 | 4/1960 | Witzky | 123/273 |
| 3,738,333 | 6/1973 | Vogelsang | 123/254 |
| 4,040,393 | 8/1977 | Decker et al. | 123/254 |
| 4,325,334 | 4/1982 | Nishida et al. | 123/286 |
| 4,511,612 | 4/1985 | Huther et al. | 123/270 |

Primary Examiner—Raymond A. Nelli
Attorney, Agent, or Firm—Finnegan, Henderson, Farabow, Garrett and Dunner

[57] ABSTRACT

An auxiliary combustion chamber for an internal combustion engine having a semi-spherical insulating ceramic liner and a heat resistant ceramic nozzle portion. The chamber has an outer metal member that is cast around the ceramic liner to impart significant compressive stress thereto. The metal member extends past the ceramic liner to form a cylindrical portion. The ceramic nozzle portion is affixed in this cylindrical portion by a shrinkage-fit.

7 Claims, 6 Drawing Figures

AUXILIARY COMBUSTION CHAMBER

BACKGROUND OF THE INVENTION

This invention relates to an improved auxiliary combustion chamber for an internal combustion engine, the inner surface of which is a ceramic.

In the case where the auxiliary combustion chamber of an internal combustion engine is made of a ceramic material surrounded by a metal member, it is desirable that the inner chamber portion be made of a ceramic material that is excellent in heat insulation in order to improve its heat efficiency. However, if the chamber portion is made of a ceramic high in heat efficiency, then the temperature gradient between the inner and outer walls thereof is large. This is especially true when a ceramic having a high thermal expansion coefficient is used and a considerably large tensile stress is induced in the outer wall which can be sufficient to break the chamber. Therefore, it is effective to apply an initial compressive stress to the ceramic component, thereby to suppress the tension due to thermal stress. For this purpose, shrinkage fit of a ceramic liner within a metal member or casting the metal around the liner may be employed. Since the ceramic chamber liner is partially spherical, it is impossible to employ the shrinkage fit method, and the casting method is generally employed.

This is especially the case where the chamber liner is made of sintered, partially stabilized zirconia material (hereinafter referred to as "sintered PSZ material", when applicable.) This compression effect is essential in order to solve the problem that the ceramic transforms from the tetragonal into the monoclinic form.

The nozzle portion of the device is formed of a highly heat resistant ceramic material because of the severe temperature conditions found at that portion of the device. Affixing the nozzle portion to the surrounding metal member can also create problems. For instance, when the chamber liner is made of sintered PSZ material having a large thermal expansion coefficient and the nozzle portion is made of sintered $Si_3N_4$ material, and both the chamber liner and the nozzle portion are covered with metal by the casting method, the contraction of the metal between the chamber liner and the nozzle portion is suppressed. As a result the compression effect is not sufficiently obtained on the sides of the sintered PSZ liner. Thus the design of the auxiliary chamber is limited.

FIG. 4 is a sectional diagram showing one example of a conventional auxiliary combustion chamber. In this auxiliary chamber, a disk-like nozzle piece 33, having orifice 37, is made of sintered $Si_3N_4$ material. It is abutted against the open portion of a bell-shaped hollow chamber liner 32 of sintered PSZ material. The nozzle piece 33 and the chamber liner 32 are covered with a metal member 31 by the casting method previously described. In FIG. 4, the liner and the metal member have an injector nozzle insertion hole 35 and a glow plug insertion hole 36. In order to maximize the compression effect of the metal casting method, the hollow chamber liner is substantially bell-shaped, and the disk-like member performs satisfactorily as the nozzle of the auxiliary chamber.

In view of the foregoing, the present applicants have proposed "Heat Insulation Material for Auxiliary Chamber in Internal Combustion Engine" under Japanese Patent Application No. 135354/1983. This invention is intended to improve the invention thus proposed, and to solve the above-described problem accompanying such conventional devices and to fully utlize the ceramic characteristic of the auxiliary combustion chamber in an internal combustion engine.

SUMMARY OF THE INVENTION

In order to achieve the above objectives the present invention comprises an auxiliary combustion chamber for an internal combustion engine. The device has a ceramic chamber liner with substantially semi-spherical inner and outer surfaces. Preferably this liner is a ceramic material having a high thermal insulation value. An outer metal member contains the ceramic liner and includes a substantially cylindrical portion extending beyond the chamber liner. The metal member is cast around the chamber liner such that solidification of the metal to form the member imparts a significant compressive stress to the chamber liner. A ceramic nozzle portion, having an orifice disposed to provide flow communication with the interior of the auxiliary combustion chamber, has a substantially cylindrical outside surface. The nozzle portion is affixed within the cylindrical portion of the metal member by a shrink fit.

Preferably the device includes heat insulating means between the nozzle portion and the outer metal member. It is further preferred that the insulating means comprise an annular gap between the nozzle portion and the outer member.

DESCRIPTION OF THE PREFERRED EMBODIMENTS

This invention will be described with reference to the accompanying drawings.

Figure 1:
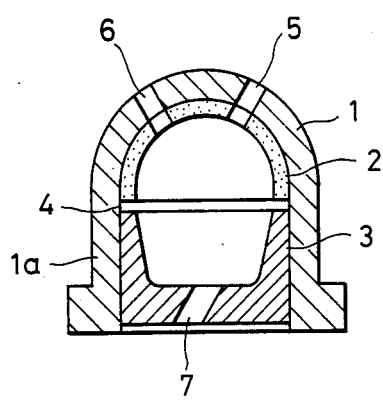
FIG. 1 is a sectional view showing a first embodiment of an auxiliary combustion chamber according to this invention.

FIG. 1 is a sectional view of one embodiment of an auxiliary combustion chamber according to the invention. The auxiliary combustion chamber includes a substantially semi-spherical hollow chamber liner 2, preferably of sintered PSZ material. As here embodied liner 2 has a fuel injector insertion hole 5 and a glow plus insertion hole 6. The auxiliary combustion chamber also includes a deep, dish-shaped nozzle portion 3 of sintered $Si_3N_4$ which has a nozzle opening 7 communicating with the main combustion chamber. When the chamber liner 2 is covered with metal 1 by the casting method hereinafter described in detail, a cylindrical protrusion 1a, whose inside diameter is smaller than the nozzle portion 3 is formed simultaneously. Then, the inside diameter of the cylindrical flange is machined, and the nozzle portion 3 is shrinkage-fit into the cylindrical flange. In FIG. 1, reference numeral 4 designates a metal gasket fitted between the chamber liner and the nozzle.

The auxiliary combustion chamber according to the invention is made of a combination of metal and ceramic by casting the metal around the liner and by shrinkage-fit of the nozzle portion. The thermal expansion coefficient of the metal used for the outer metal casting should be larger than $11 \times 10^{-6}/°C$. which is the thermal expansion coefficient of sintered PSZ and smaller than $17 \times 10^{-6}/°C$. in the range of room temperature to 700° C. It is preferred that the metal is, for instance, monel alloy. The coefficients of thermal expansion are significant for the following reasons: In the case of a metal whose thermal expansion coefficient is smaller than that of sintered PSZ material, no compression stress is applied to the liner. In the case of a metal whose thermal expansion coefficient is larger than $17 \times 10^{-6}/°C$., the chamber liner of sintered PSZ may be broken by the shearing force resulting from the large compression forces which is caused when the chamber liner is cooled.

The inside of the cylindrical protrusion which is formed simultaneously when the chamber liner is covered with metal by casting is machined to predetermined dimensions. Then, the cylindrical protrusion is heated so as to be expanded. Under this condition, a gasket of stainless steel is inserted into the cylindrical protrusion to the bottom of the chamber part of sintered PSZ matrial. Thereafter, the nozzle portion of $Si_3N_4$ sintered material is shrinkage-fit into the cylindrical protrusion. The $Si_3N_4$ sintered material has a thermal expansion coefficient of $3.2 \times 10^{-6}/°C$. which is considerably different from that of the above-described metal. However, with the inside diameter of the metal cylindrical protrusion taken into account, compression stress can be readily applied to the nozzle portion of sintered $Si_3N_4$ material.

As was described above, the chamber liner 2 of sintered PSZ and the nozzle portion 3 of sintered $Si_3N_4$ material, which are different from each other in thermal expansion coefficients, are combined together by casting the metal around the ceramic liner and affixing the nozzle portion by a shrinkage-fit. In this case, compressive stress can be effectively applied to the chamber liner of sintered PSZ and the nozzle portion of sintered $Si_3N_4$ without affecting the design of both the chamber liner and the nozzle portion. Furthermore the ceramic characteristic of the auxiliary combustion chamber can be sufficiently utilized. In addition, the configuration of the auxiliary combustion chamber can be determined in conformance with the engine performance. Furthermore, the auxiliary combustion chamber of the invention can be readily mounted on the engine's cylinder head, because it is a single part.

Figure 2A:
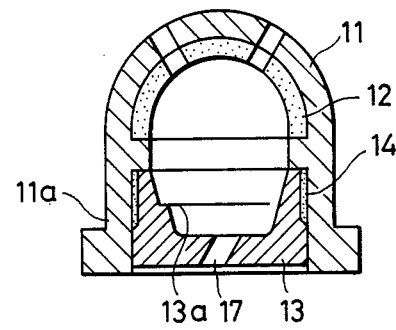
FIG. 2(A) is a sectional view showing a second embodiment of the auxiliary combustion chamber according to the invention.
Figure 2B:
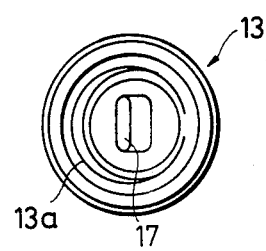
FIG. 2(B) is a top view of a nozzle portion of the auxiliary chamber of FIG. 2(A).

FIG. 2(A) is a sectional view showing a second embodiment of the auxiliary combustion chamber according to the invention. FIG. 2(B) is a top view of the nozzle portion of the auxiliary chamber shown in FIG. 2(A).

In the auxiliary combustion chamber, the chamber liner 12 is covered with metal 11 to the lower edge of its wall by casting the metal over the liner, the inside diameter of the cylinder 11a is machined, and a nozzle portion 13 is shrinkage-fit into the cylinder 11a. The nozzle portion 13 is U-shaped in section, and has a injector opening 17 in the bottom and a step 13a on the inner wall to improve the efficiency of the opening. Furthermore, when the nozzle portion 13 is shrinkage-fit into the cylinder 11a of metal 11, there is provided a heat insulation layer 14 therebetween as shown in FIG. 2(A), to improve the thermal efficiency of the auxiliary combustion chamber.

Figure 3A:
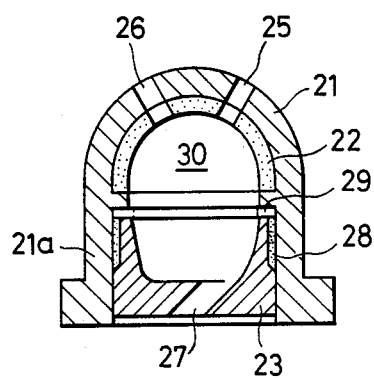
FIG. 3(A) is a sectional view showing a third embodiment of the auxiliary chamber according to the invention.
Figure 4:
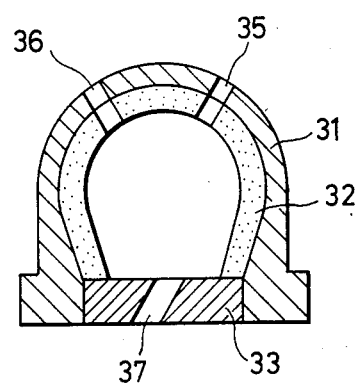
FIG. 4 is a sectional view of a conventional auxiliary combustion chamber.
Figure 3B:
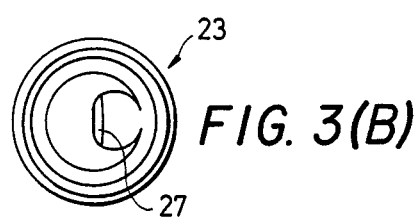
FIG. 3(B) is a top view of a nozzle portion of the auxiliary chamber of FIG. 3(A).

FIG. 3 shows a third embodiment of the auxiliary combustion chamber according to the invention. More specifically, FIG. 3(A) is a sectional view of this auxiliary combustion chamber, with FIG. 3(B) being a top view of a nozzle portion in the auxiliary combustion chamber of FIG. 3(A).

A more detailed description of the process of manufacturing the auxiliary combustion chamber will be described with reference to the third example of FIG. 3.

First, a substantially semi-spherical hollow chamber liner 22 of sintered PSZ material, having an injector insertion hole 25 and a glow plug insertion hole 26, and a nozzle portion 23 of sintered $Si_3N_4$ having a nozzle opening 27 were formed by pressing and sintering. The upper portion of the outer wall of the nozzle portion 23 was cut to form an annular gap to provide heat insulation gap 28 between the nozzle portion 28 and the cylindrical protrusion 21a which was formed when the chamber part 22 was covered with metal by casting.

The inside 30 of the chamber liner 22, the injector insertion hole 25, and the glow plug insertion hole 26 were filled with zircon sand containing water glass as a binder, to form a core therein. Molten wax material was applied to the region which is below the chamber liner 22 and the portions other than that occupied by the core, until the height of the wax thus applied reached 3 mm. Then a cylinder, having a diameter smaller by 1 mm than the outside diameter of the chamber liner 22 and a height larger by 3 mm than the height of the nozzle portion 23 was formed out of zircon sand. The chamber liner 22 was placed on the end face of the zircon sand cylinder thus formed by using adhesive. Molten wax was applied to the outer surfaces of the chamber liner 22 and the cylinder, until the configuration of the wax thus applied became similar to that of the metal part 21 to be formed later by casting. The entire surface of the wax layer thus formed, except for the areas which were provided for a wax melting hole and a metal pouring inlet, was coated with a mixture of zircon sand and a solution of ethylsilicate, and then covered with coarse sand, 80 mesh. The coating and sand covering operations were carried out five times. Then, the wax material was removed by melting in the air at 100° C. Thereafter, a sintering operation was carried in the air at 1200° C., to form the sand shell into a mold. Molten monel alloy at 1450° C. was poured into the mold through the pouring inlet. After being cooled to room temperature, the mold was removed. Then, the mold of zircon sand and the core were removed by melting them with an NaOH solution at 150° C. As a result, the chamber liner 22 was covered with a metal casting; that is, the metal part 21 having the cylindrical protrusion was formed. After the end face of the metal part 21 was machined, the inner wall of the lower portion of the cylindrical protrusion was machined to form an annular shoulder having the height from the end face which was larger by 2 mm than the height of the nozzle portion 23 and the diameter which was smaller by 0.05 mm than the outside diameter of the nozzle portion 23. A gasket 29 made of stainless steel was fitted into the cylindrical protrusion heated at 500° C., and the nozzle portion 23 was shrinkage-fit thereinto, as a result of which the auxiliary chamber as shown in the part (A) of FIG. 3 was obtained.

The construction of the auxiliary chamber according to the invention is as described above. Therefore, the auxiliary chamber has a large degree of freedom in design, and is high in mechanical strength, heat insulation, heat resistance and durability.

The present invention has been described in terms of preferred embodiments, but the invention is not limited thereto. The invention is defined by the appended claims and their equivalents.

What is claimed is:

1. An auxiliary combustion chamber for an internal combustion engine, said chamber comprising:
   (a) a chamber liner formed of a ceramic material that is an effective thermal insulator, said chamber liner having substantially hemispherical internal and external surfaces;
   (b) an outer metal member cast around said chamber liner, said outer member including a substantially hemispherical portion contacting said outer surface of said chamber liner and imparting a compressive stress to said chamber liner, said metal member further including a substantially cylindrical portion contiguous with the open end of said hemispherical portion and extending beyond said chamber liner, said cylindrical portion having an inner surface of a predetermined inside diameter at ambient temperature; and
   (c) a substantially cup-shaped nozzle portion formed of a heat-resistant ceramic material and having an orifice disposed in the bottom thereof to provide flow communication from a main combustion chamber to the interior of said auxiliary combustion chamber, said nozzle portion including a substantially cylindrical outer surface having a diameter greater than said predetermined inside diameter of said cylindrical portion of said metal member, said nozzle portion being shrink-fit within said cylindrical portion of said outer metal member with said cylindrical outer surface of said ceramic nozzle contacting said inner surface of said cylindrical portion of said metal member and said bottom of said nozzle portion being disposed away from said hemispherical portion of said metal member.

2. The device of claim 1, wherein said ceramic material comprising said chamber liner is sintered, partially stabilized zirconia.

3. The device of claim 1, wherein said ceramic material comprising said nozzle portion is sintered $Si_3N_4$.

4. The device of claim 1 wherein said ceramic nozzle portion includes an annular recess in a portion of said outer surface thereof to provide an annular gap between said nozzle portion and a portion of said inner surface of said cylindrical portion of said metal member.

5. The device of claim 1, further comprising heat insulating means disposed between said nozzle portion and said metal member.

6. The device of claim 1 wherein said metal member includes means for engaging the edge of said ceramic liner at the open end of said substantially hemispherical ceramic liner.

7. The device of claim 6 wherein said engaging means comprises an annular flange on the inner surface of said metal member.

* * * * *